United States Patent
Levesque et al.

(10) Patent No.: US 10,218,249 B2
(45) Date of Patent: Feb. 26, 2019

(54) BRUSHLESS DC MOTORIZATION APPARATUS

(71) Applicant: BIONX CANADA INC., Aurora (CA)

(72) Inventors: Daniel Levesque, Candiac (CA); Jerome Cros, Quebec (CA)

(73) Assignee: BIONIX CANADA INC., Aurora (CA)

( * ) Notice: Subject to any disclaimer, the term of this patent is extended or adjusted under 35 U.S.C. 154(b) by 0 days.

(21) Appl. No.: 15/252,313

(22) Filed: Aug. 31, 2016

(65) Prior Publication Data

US 2017/0040879 A1  Feb. 9, 2017

Related U.S. Application Data

(63) Continuation of application No. 13/811,693, filed as application No. PCT/CA2011/050441 on Jul. 20, 2011, now abandoned.

(Continued)

(51) Int. Cl.
*H02K 21/22* (2006.01)
*H02K 3/28* (2006.01)
(Continued)

(52) U.S. Cl.
CPC .............. *H02K 21/22* (2013.01); *B62M 7/12* (2013.01); *H02K 1/146* (2013.01); *H02K 1/187* (2013.01);
(Continued)

(58) Field of Classification Search
CPC ........ H02K 1/2786; H02K 1/146; H02K 3/18; H02K 3/28; H02K 21/22; H02K 2213/03
See application file for complete search history.

(56) References Cited

U.S. PATENT DOCUMENTS

| | | | |
|---|---|---|---|
| 5,227,704 A * | 7/1993 | Erdman | ................ D06F 37/304 |
| | | | 318/400.29 |
| 6,278,216 B1 * | 8/2001 | Li | ....................... B60K 7/0007 |
| | | | 310/424 |

(Continued)

FOREIGN PATENT DOCUMENTS

| | | |
|---|---|---|
| DE | 19983946 B4 | 4/2010 |
| DE | 202011110258 U1 | 5/2013 |

(Continued)

OTHER PUBLICATIONS

Screenshots of the repairing of a mater with comments of Mar. 2010, Endless-Sphere.com.

(Continued)

*Primary Examiner* — Dang Le
(74) *Attorney, Agent, or Firm* — Dickinson Wright PLLC

(57) ABSTRACT

A direct-drive brushless DC motorization apparatus is provided. The apparatus includes an outer rotor having poles constructed with segments of forty or forty-four permanent magnets alternatively magnetized north and south. The outer rotor is adapted to be part of a wheel and is rotatable with respect to an axis of the wheel. The outer rotor is mounted about a stator core of ferromagnetic material and is separated from the stator core by a clearance gap. The stator core has forty-two slots, and adjacent slots are separated by teeth. A three-phase winding with coils of insulated wire is wound around the teeth of the stator core. The three-phase winding is divided in two sets of consecutive teeth for each of the three phases, with each of the two sets of a same phase being diametrically opposed in the stator core.

19 Claims, 5 Drawing Sheets

Related U.S. Application Data

(60) Provisional application No. 61/366,956, filed on Jul. 23, 2010.

(51) Int. Cl.
   *H02K 1/27* (2006.01)
   *H02K 1/18* (2006.01)
   *B62M 7/12* (2006.01)
   *H02K 1/14* (2006.01)
   *H02K 3/18* (2006.01)
   *H02K 7/00* (2006.01)

(52) U.S. Cl.
   CPC ............ *H02K 1/2786* (2013.01); *H02K 3/18* (2013.01); *H02K 3/28* (2013.01); *H02K 7/003* (2013.01); *B60L 2200/12* (2013.01); *B60L 2220/46* (2013.01); *H02K 2213/03* (2013.01); *Y02T 10/641* (2013.01)

(56) References Cited

U.S. PATENT DOCUMENTS

| | | | | |
|---|---|---|---|---|
| 6,630,764 | B1 * | 10/2003 | Dube | B60L 11/1801 180/65.1 |
| 6,727,632 | B2 * | 4/2004 | Kusase | H02K 1/27 310/112 |
| 6,866,111 | B2 | 3/2005 | Dube et al. | |
| 6,949,864 | B2 * | 9/2005 | Maslov | B62M 6/40 310/254.1 |
| 7,706,935 | B2 | 4/2010 | Dube et al. | |
| 2002/0145354 | A1 * | 10/2002 | Hakamata | H02K 3/522 310/179 |
| 2004/0104637 | A1 | 6/2004 | Dube et al. | |

FOREIGN PATENT DOCUMENTS

| | | |
|---|---|---|
| FR | 2488210 A1 | 2/1982 |
| GB | 2428901 A | 2/2007 |
| WO | WO0060724 A1 | 10/2000 |
| WO | WO03030336 A1 | 4/2003 |

OTHER PUBLICATIONS

Enlarged picture of a mater together with the schematic representation of the coil arrangement.

User manual of the P-Motors with revision date Oct. 2006.

Paper of S. Skaar, "Distribution, coil-span and winding factors for PM machines with concentrated windings", pp. 1-6.

Howe, D. et al., "Three-Phase Modular Permanent Magnet Brushless Machine for Torque Boosting on a Downsized ICE Vehicle", IEE Transactions on Vehicular Technology, vol. 54, No. 3, May 2005.

F. Libert et al., "Investigation on pole-slot combination for permanent-magnet machines with concentrated windings", Proceedings of the International Conference on Electrical Machines, ICEM, 2004, pp. 530-535, Dec. 31, 2004.

Florence Meier, "Permanent-Magnet Synchronous Machines with Non-Overlapping Concentrated Windings for Low-Speed Direct-Drive Applications", Royal Institute of Technology, School of Electrical Engineering, Electrical Machines and Power Electronics, Stockholm 2008, ISBN 978-91-7415-089-6; Caver, Preface (v) and pp. 3, 4 and 13 to 16.

J. Wang et al., "Three-phase modular permanent magnet brushless machine for torque boosting on a downsized ICE vehicle", IEEE Transaction on Vehicular Technology, vol. 54, No. 3, May 2005, pp. 809-816.

\* cited by examiner

BRUSHLESS DC MOTORIZATION APPARATUS

CROSS-REFERENCE TO RELATED APPLICATION

This U.S. continuation patent application claims priority to U.S. national phase patent application Ser. No. 13/811,693, filed Feb. 1, 2013, which claims priority to International Application no. PCT/CA11/50441 filed Jul. 20, 2011, which claims priority to U.S. provisional patent application No. 61/366,956, filed Jul. 23, 2010, the entire contents of which are incorporated herein by reference.

FIELD OF THE APPLICATION

The present application relates to the motorization of electric vehicles using permanent-magnet synchronous machine such as brushless DC machines, for electric vehicles such as bicycles, rolling chairs, scooters, tricycles, golf carts, trolleys and small utility vehicles, or the like.

BACKGROUND OF THE ART

In lightweight vehicle applications, it is often desired to produce high starting torque and to ensure variable assistance, whereby electric machines are well suited therefore as opposed to other types of motors or engines. The use of a brushless direct-current (DC) machine is particularly well adapted to these kinds of applications. Some brushless DC machines use a permanent magnet external rotor with three phases of driving coils on the stator core. According to one type of machine, the position of the rotor is sensed with sensors (e.g., Hall effect sensors) and the associated drive electronics. The coils are activated by the drive electronics, based on the detection signals from either the sensors or from the back electromotive force (EMF).

Brushless DC machines are relatively simple in construction, and cost-effective in maintenance in view of their brushless nature. However, there remains a need to produce increasingly efficient brushless DC machines, in a cost-efficient manner. For instance, the weight of the machine components must be minimized, while not affecting the structural integrity of the machine.

SUMMARY OF THE APPLICATION

It is therefore an aim of the present disclosure to provide a new brushless DC machine for vehicles.

It is a further aim of the present disclosure to have a brushless DC machine that is relatively lightweight.

Therefore, in accordance with the present application, there is provided a new direct-drive brushless DC motorization apparatus that is relatively lightweight. The apparatus includes an outer rotor with poles constructed with segments of permanent magnet material alternatively magnetized north and south. The outer rotor is adapted to be part of a wheel and rotates with the wheel about an axis thereof. A stator core of ferromagnetic material is spaced inwardly of the rotor and defines a clearance gap with the rotor such that the rotor is rotatable about the stator core. The stator core has forty-two slots and defines teeth between said slots. A three-phase winding with coils of insulated wire is wound around the teeth of the stator core. The three-phase winding is divided in two sets of consecutive teeth for each of the three phases, with each of the two sets of a same phase being diametrically opposed in the stator core.

Further in accordance with the present application, the three-phase winding are divided into two sets of seven consecutive teeth for each of the three phases.

Still further in accordance with the present application, each phase of the three-phase winding is divided into sets of six and eight consecutive teeth.

Still further in accordance with the present application, the outer rotor comprises forty poles.

Still further in accordance with the present application, the outer rotor comprises forty-four poles.

Still further in accordance with the present application, the stator core has a hub supporting a stator yoke, wherein the hub comprises structural elements extending diametrically between centers of each set of the same phase.

Still further in accordance with the present application, the hub has a six-pointed star shape, with an interconnection between points of the star shape and the stator yoke being in alignment with a center of each set of teeth.

Still further in accordance with the present application, each set of teeth comprises seven consecutive teeth.

Still further in accordance with the present application, the stator is fixed to an axle of the wheel.

Still further in accordance with the present application, the rotor is adapted to be operatively connected to a freewheel of a vehicle to rotate therewith in one rotational orientation. Still further in accordance with the present application, the rotor is adapted to be connected to spokes of a wheel, with the spokes projecting radially from a casing of the rotor Still further in accordance with the present application, each phase comprises fourteen teeth.

DESCRIPTION OF EXAMPLE EMBODIMENTS

Figure 1:
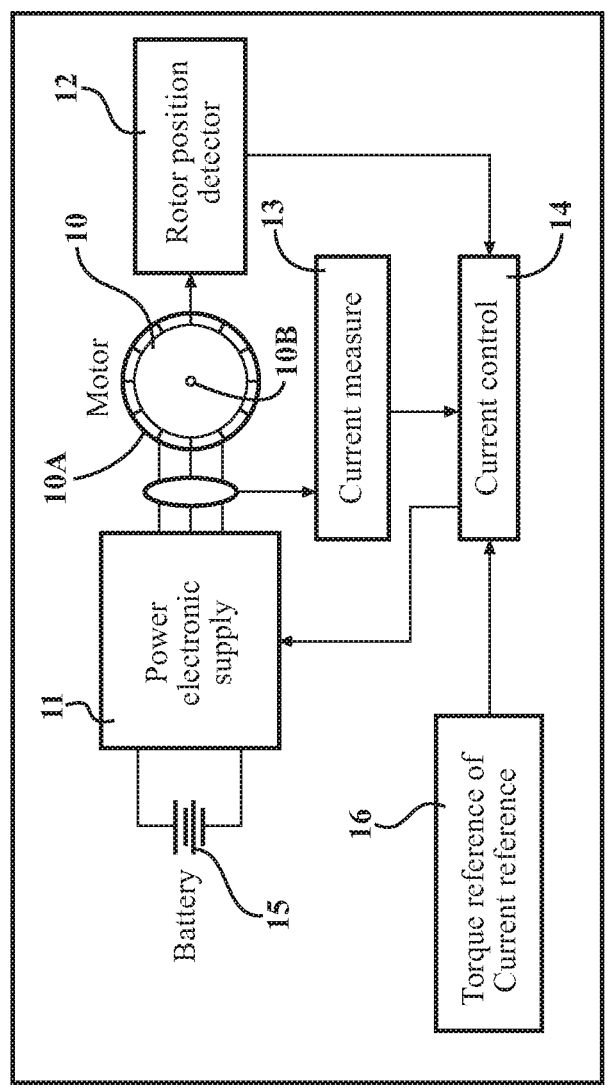
FIG. 1 is a schematic diagram of a brushless DC machine system including a brushless DC machine, a power electronics system and current control system.
Figure 5:
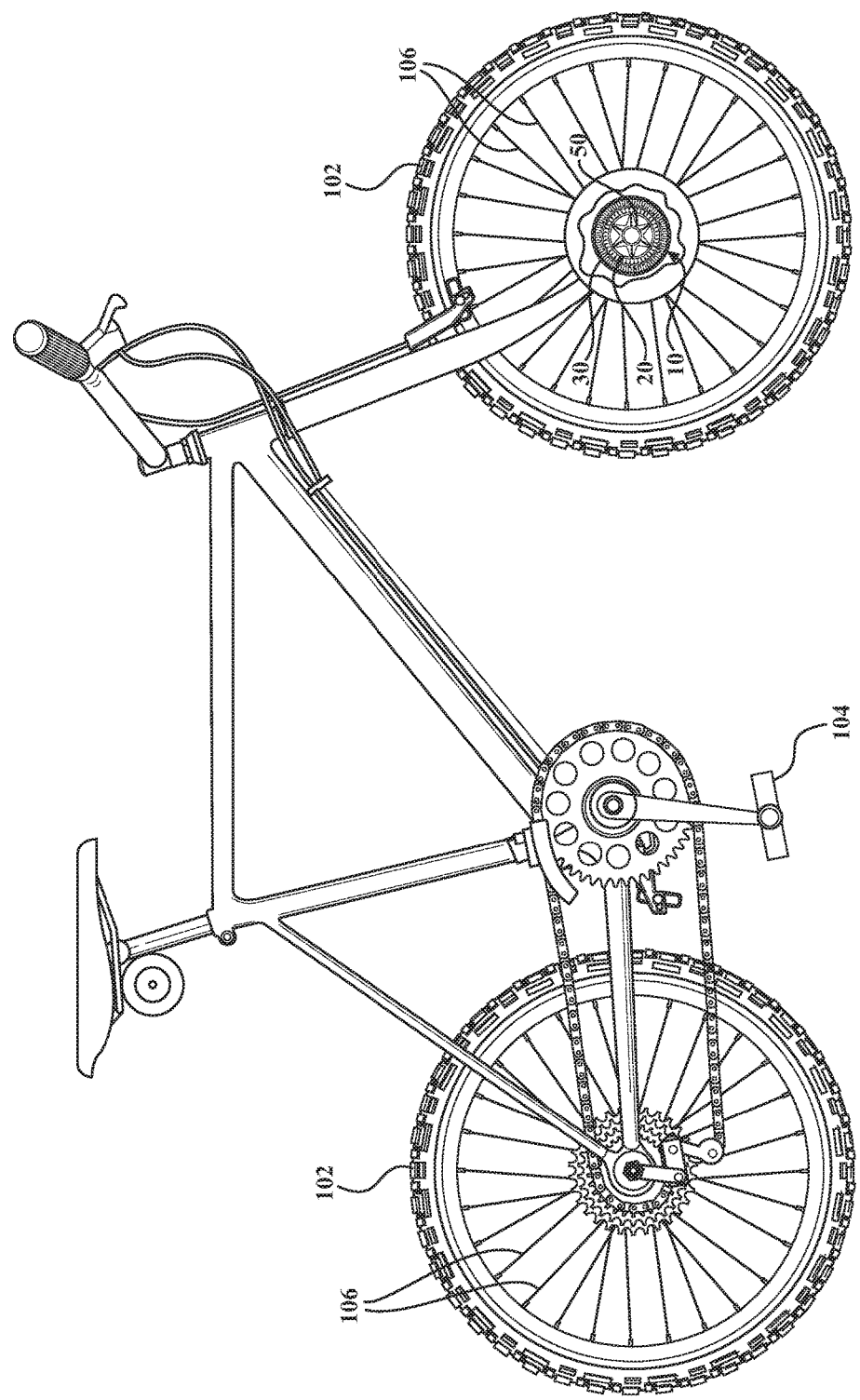
FIG. 5 is a perspective view of an example electric bicycle including the brushless DC machine.

Referring to the drawings and more particularly to FIG. 1, there is illustrated a brushless DC machine system of the type used in lightweight vehicles, operable in a motor mode and in a generation mode. In one embodiment, the brushless DC machine system is used as a power assistance unit in a bicycle 100, as shown in FIG. 5, to add power to the pedaling effort of the rider. Other uses are considered as well, for instance with the use of the brushless DC machine system as the sole motorization unit of vehicles as opposed to being a power assistance unit. The vehicles may include rolling chairs, scooters, tricycles, golf carts, trolleys and small utility vehicles, or the like.

According to one embodiment, the brushless DC machine system includes a 3-phase permanent magnet brushless DC machine 10 part of a wheel 10A and with optional free wheel 10B, a power supply circuit 11, a rotor position detector 12 (e.g., with Hall effect sensors), a current measurement system 13 and/or a current regulation system which is comprised of a current control circuit 14 fed by the current measuring circuit 13 and a torque reference or current reference circuit 16. The current control circuit 14 is connected to the power supply circuit 11 to control the torque of the machine 10.

It is pointed that the machine 10 is identified as being a 3-phase permanent magnet brushless DC machine, This generic identification is deemed to also include permanent magnet synchronous machines, for instance operated with sinusoidal waveform current, or the like. Moreover, reference to a brushless DC motor also covers the use of the machine or motor 10 in a motorization mode and in a generator mode.

The afore-described system is a conventional operating system for a brushless DC motor, and is one among numerous other systems that may be used to operate the brushless DC machine 10. However, the system of FIG. 1 can be used for motor or generator operation with energy recuperation on a battery 15 during braking periods. The afore-described system may be operated with a rectangular waveform current in the winding phases, for cost efficient operation. In such a case, the motor torque is controlled by a simple current regulation and the phase voltage is chopped with a pulse width modulation technique (PWM). Other operation modes are considered as well, such as an operation with sinusoidal waveform current.

Figure 2:
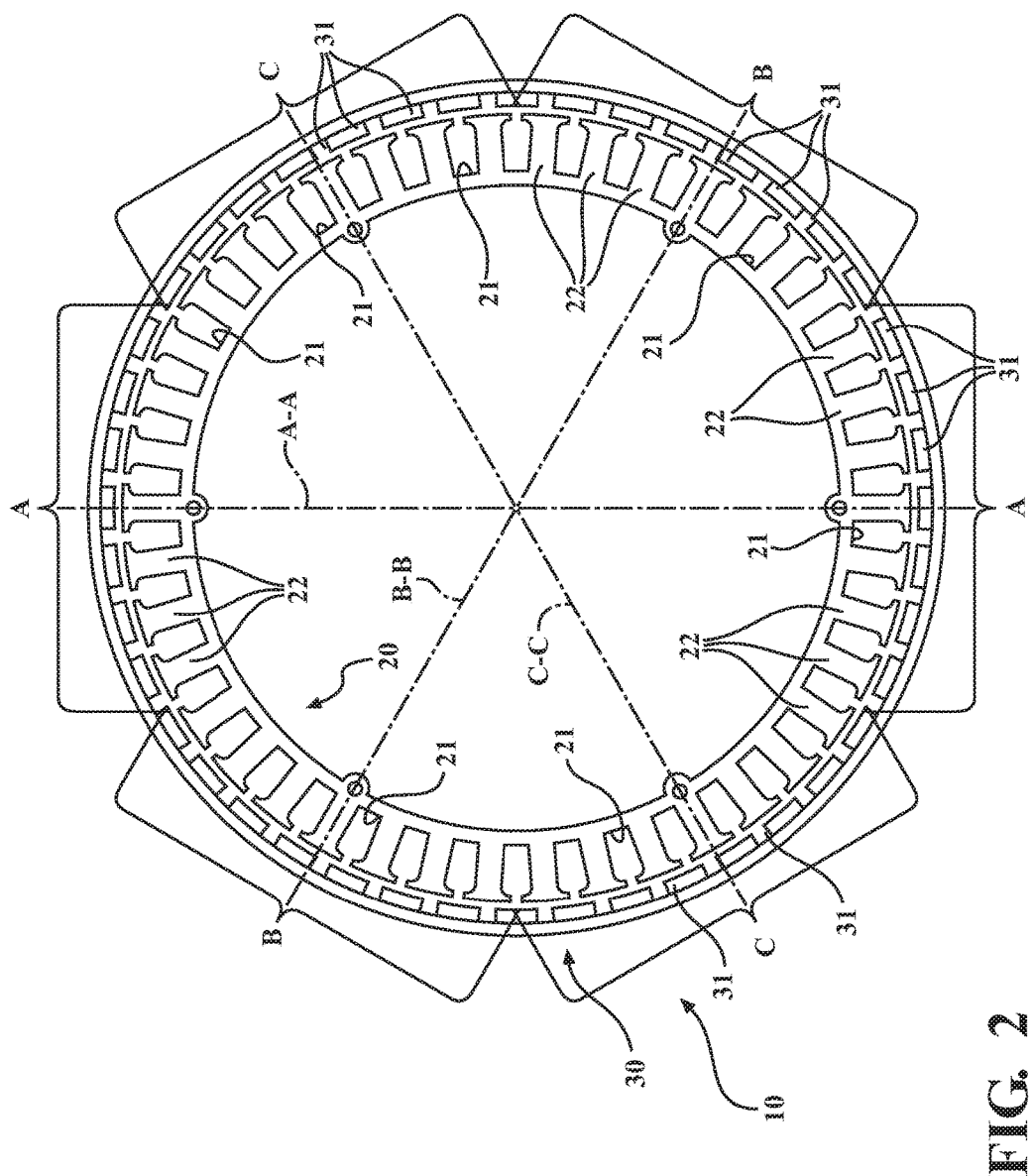
FIG. 2 is a side elevation view of a brushless DC machine in accordance with the present disclosure, with a housing removed to show an interior thereof.

Referring to FIG. 2, there is illustrated the brushless DC machine 10, with a housing and other parts removed to show an interior structure of the machine 10. The brushless DC machine 10 of FIG. 2 may be used in a direct-drive configuration, with a rotor of the machine 10 being integral with a wheel of the vehicle powered by the machine 10. In the direct-drive configuration, the machine 10 has a stator core 20 that is secured to an axle of the wheel of a vehicle, or is generally immovable with respect to an axis of the wheel. The yoke of the stator core 20 has forty-two slots 21, separated by teeth 22, typically made of iron (i.e., ferromagnetic material). Although not shown, coils of insulated wire are wound about at least some of the teeth 22, in accordance with a phase interconnection described below.

A cylindrical outer rotor 30 is mounted about the stator core 20, and is separated from the stator core 20 by a suitable clearance gap. The rotor 30 is supported for instance by the casing of the machine 10 (which itself rotates about the axle), and is rotatable with respect to the axis of the wheel. A remainder of the wheel projects radially from the rotor 30 and supports a tire. In an embodiment, spokes of the wheel project radially or peripherally from an outer surface of the rotor 30. The rotor 30 is constituted of segments of permanent magnets 31 mounted on the rotor inner surface and alternatively magnetized north and south. In FIG. 2, there is illustrated forty-four of the permanent magnets 31, although forty magnets may be used as well with the forty-two slots 21 of the stator core 20.

The high number of poles reduces the iron volume. By increasing the number of poles, the flux per pole during operation is reduced as compared with a machine producing a similar power output with a lesser amount of poles. Accordingly, as the sectional dimensions of teeth are proportional to the flux, the sectional dimensions for a forty-two pole machine are smaller than the sectional dimensions for the teeth of a machine with fewer poles, for a similar power output. There results a lower weight for the forty-two pole machine when compared to machines having a fewer amount of poles for a similar power output.

Figure 3:
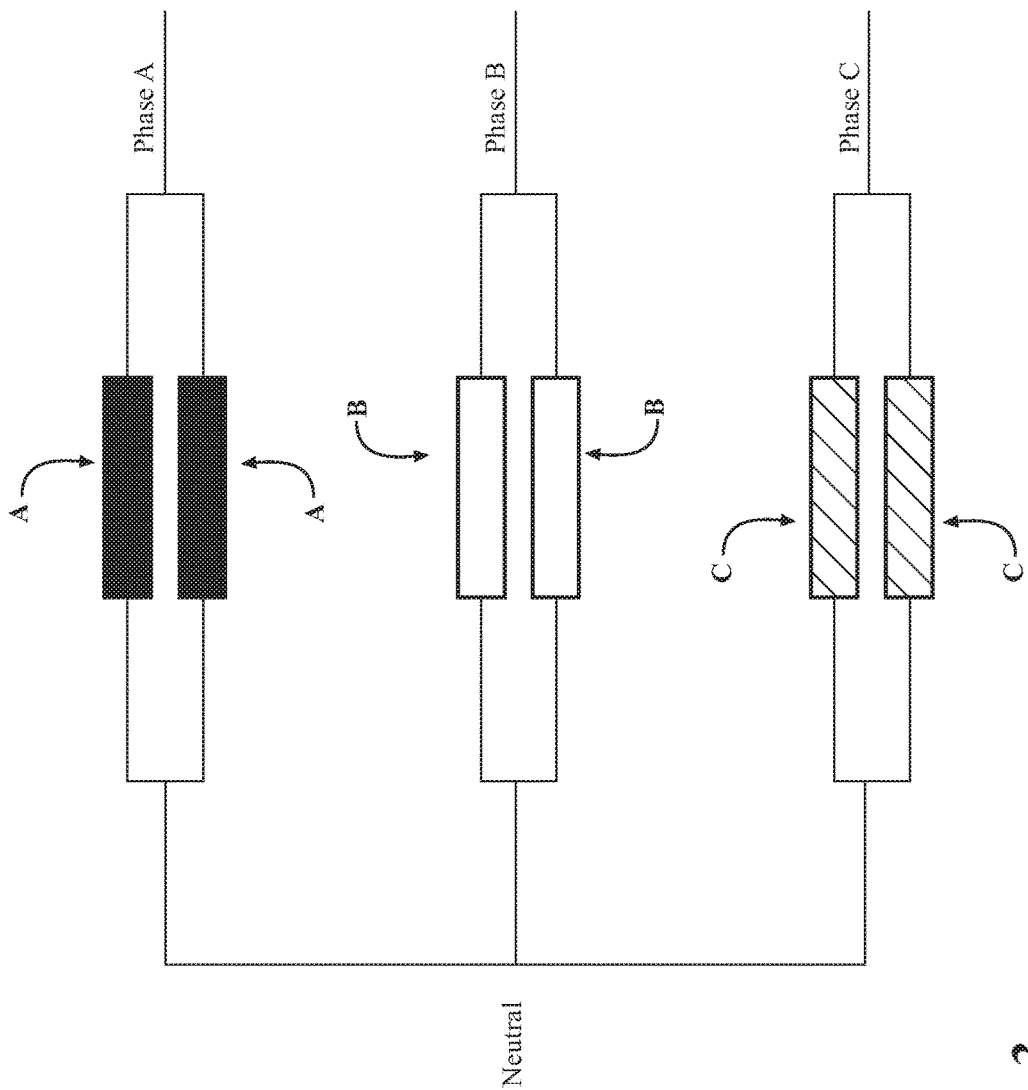
FIG. 3 is a schematic diagram of phase interconnections for the brushless DC machine of FIG. 2.
Figure 4:
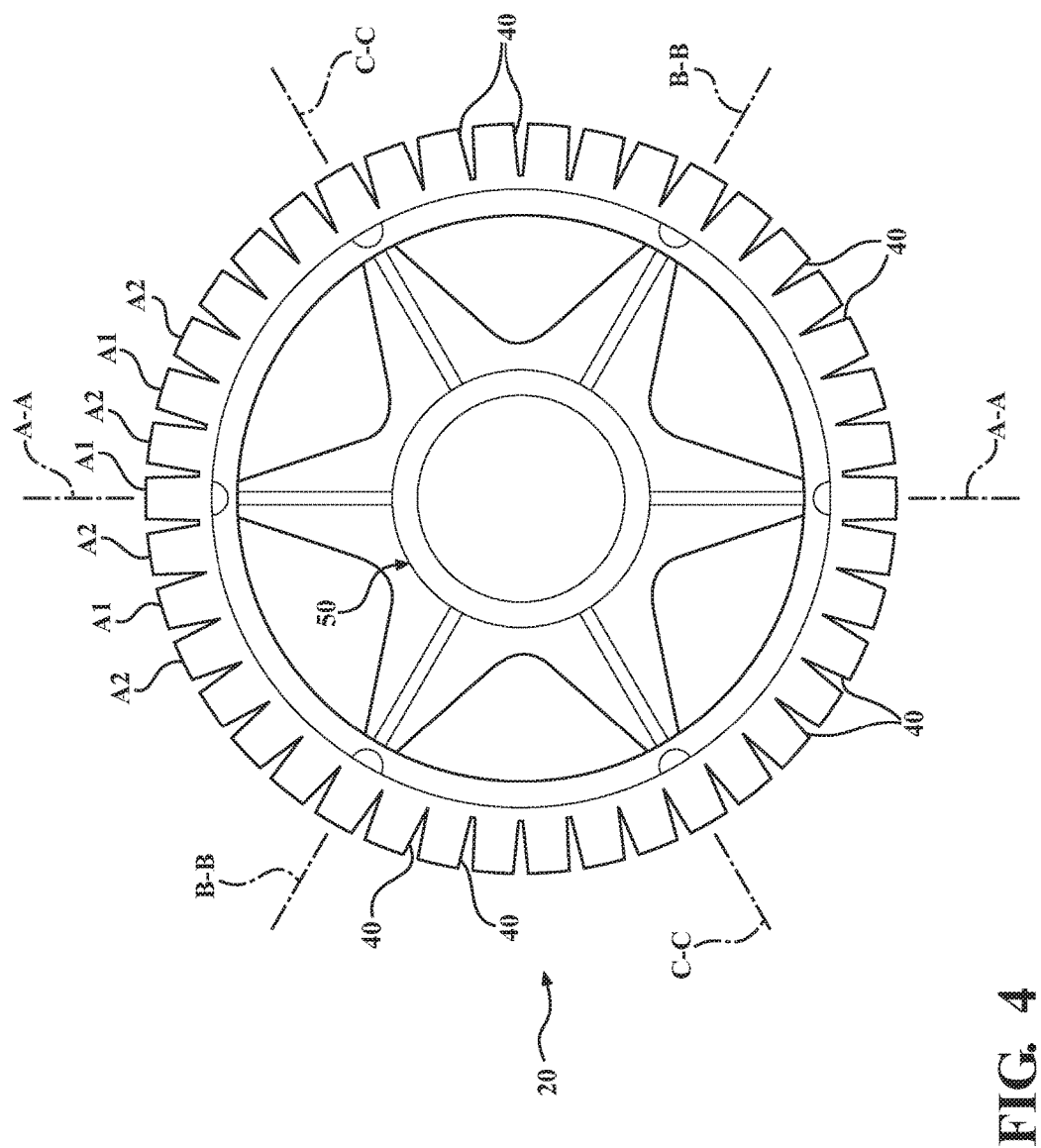
FIG. 4 is a perspective view of a stator core of the brushless DC machine of FIG.

Referring concurrently to FIGS. 2-3, an example of a phase interconnection of the machine 10 is shown. The teeth 22 are regrouped in two continuous sets of teeth per phase, as shown by sets A, B, and C. According to one embodiment, each set comprises seven consecutive teeth 22. However, other arrangements of sets may also be used, for instance phases each consisting of a set of six and a set of eight consecutive teeth 22. It is also considered to have other phase configurations, for instance with two sets of six consecutive teeth 22, two sets of seven consecutive teeth 22, and two sets of eight consecutive teeth 22, as an example. Any appropriate number of consecutive teeth per set for a total of six sets may be used. By the arrangement of six sets of teeth with two sets per phase, it is observed that the two sets of a same phase are diametrically opposed in the stator core 20, as shown by lines A-A, B-B, and C-C. In the embodiment featuring seven consecutive teeth per set, the centers of the sets of a same phase are diametrically opposed. Accordingly, the magnetic forces to which are exposed the sets of teeth 22 operated in a same phase oppose each other and minimize their effect on the center of the stator core 20. In the illustrated embodiment of FIG. 3, a neutral line is also interconnected to the phases. With the 3-phase interconnection described above, the above-referred phase interconnections and components of the system of FIG. 1 may be off-the-shelf products. Referring to FIG. 4, the stator core 20 is shown with the coils 40 of insulated wire wound on the teeth 22. There are two coils per slot 21, although other suitable configurations may be used as well in the machine 10. Adjacent coils 40 of a same set are wound in opposite directions, as shown for instance by A1 and A2.

The interconnection of phases and the coil winding may be any other appropriate alternative. For instance, there may be used a single coil per slot 21. Also, as an alternative to the interconnection shown in FIG. 3, other interconnections could also be used, such as a delta interconnection.

Still referring to FIG. 4, a hub of the stator core 20 is illustrated at 50. In the embodiment of FIG. 4, the hub 50 is shaped as a six-pointed star, with a cylindrical housing portion centrally located in the six-pointed star. The star hub 50 is oriented so as to have the points in central alignment with each set of teeth Accordingly, when the teeth 22 of any given set (i.e., for phase A, B or C) are subjected to forces resulting from the magnetic fields, the central position of the points of the star hub 50 allows the uniform distribution of the load on the center of the hub 50. It is considered to use other types and shapes of hubs as well.

The brushless DC machine structure described in FIGS. 2-4 is well suited to be used in a direct-drive configuration for lightweight vehicles, such as bicycles. More specifically, the 42-pole arrangement is relatively lightweight compared to machines with similar power output but with fewer poles. The 42-pole arrangement on the other hand has greater diameter than machines with fewer poles, whereby the resulting machine is well suited to be wheel-mounted, as bicycle wheels commonly have large diameters (e.g., 26 inch-29 inch, 650 mm-700 mm). In the direct-drive configuration on a bicycle, rotor may be operatively connected to a freewheel, such that pedaling actuation is transmitted to the rotor via the cassette on the free heel. On the other hand, in the absence of a pedaling input, the freewheel allows idling of the cassette while the machine 10 may actuate the wheel. As an alternative, the direct drive configuration may be used for the front wheel of a bicycle.

An example of the electric bicycle 100 including the brushless DC machine 10 is shown in FIG. 5. The electric bicycle 100 of FIG. 5 includes a pair of wheels 102 and the brushless DC machine 10 is secured to a front wheel 102 of the bicycle 100 The bicycle 100 further includes pedals 104 operative connected to the outer rotor 30 of the brushless DC machine 10. The wheels 102 include spokes 106, and the spokes 106 project radially from the outer rotor 30.

As indicated above, the brushless DC motor structure described in FIGS. 2-4 is well suited for applications including electric vehicles, such as bicycles, rolling chairs, scooters, tricycles, golf cars, trolleys and small utility vehicles, or the like. The brushless machine 10 has a relatively high number of teeth 21 in the stator core 20. However, in the above-referred applications, the stator cores 20 typically have diameters ranging between 150 mm and 350 mm, for example. In such ranges, the teeth 21 have a suitable thickness in terms of structural integrity.

Obviously, many modifications and variations of the present invention are possible in light of the above teachings and may be practiced otherwise than as specifically described while within the scope of the appended claims.

The invention claimed is:

1. A direct-drive brushless DC motorization apparatus comprising:
    an outer rotor with forty or forty-four poles constructed with segments of permanent magnet material alternatively magnetized north and south, said outer rotor rotatable about an axis of a wheel;
    an inner stator core of ferromagnetic material spaced inwardly of said outer rotor and defining a clearance gap with said outer rotor such that said outer rotor is rotatable about said inner stator core, said inner stator core having forty-two slots and defining teeth between said slots; and
    a three-phase winding with coils of insulated wire being wound around said teeth of said inner stator core, said three-phase winding being divided in two sets of consecutive teeth for each of said three phases, with each of said two sets of a same phase being diametrically opposed in said inner stator core;
    wherein said outer rotor, said inner stator core, and said three-phase winding is configured to operate under a motorization mode and/or an energy recuperation mode;
    wherein said inner stator core has a hub supporting a stator yolk, and wherein structural elements extend radially outwardly from said hub with said structural elements being positioned circumferentially between centers of each set of said teeth of the same phase.

2. The brushless DC motorization apparatus of claim 1, wherein said two sets of said consecutive teeth each include seven consecutive teeth.

3. The brushless DC motorization apparatus of claim 1, wherein said inner stator core has an outer diameter ranging between 150 mm and 350 mm.

4. The brushless DC motorization apparatus of claim 3, wherein said outer diameter of said inner stator core ranges between 150 mm and 250 mm.

5. The brushless DC motorization apparatus of claim 1, wherein said outer rotor has forty poles and said inner stator core has forty-two slots.

6. The brushless DC motorization apparatus of claim 1, wherein said outer rotor has forty-four poles and said inner stator core has forty-two slots.

7. The brushless DC motorization apparatus of claim 1, wherein said inner stator core is adapted to be secured to an axle of a vehicle.

8. The brushless DC motorization apparatus of claim 1, wherein said outer rotor is adapted to be operatively connected to a freewheel of a bicycle.

9. The brushless DC motorization apparatus of claim 1, wherein each phase comprises fourteen consecutive teeth.

10. A direct-drive brushless DC motorization apparatus powered wheel comprising:
    an outer rotor with forty poles or forty-four poles constructed with segments of permanent magnet material alternatively magnetized north and south, said outer rotor rotatable about an axis of the wheel;
    a plurality of spokes projecting radially outwardly from an outer surface of said outer rotor;
    an inner stator core spaced inwardly of said outer rotor and defining a clearance gap with said outer rotor such that said outer rotor is rotatable about said inner stator core, said inner stator core having forty-two slots and defining teeth between said slots;
    said inner stator core secured to an axle of the wheel; and
    a winding with coils being wound around said teeth of said inner stator core, said winding including multiple phases and being divided in sets of seven consecutive teeth for each of said phases, with each of said sets of a same phase being diametrically opposed in said inner stator core;
    wherein said outer rotor, said inner stator core, and said three-phase winding is configured to operate under a motorization mode and/or an energy recuperation mode.

11. The brushless DC motorization apparatus of claim 10, wherein said outer rotor has forty poles or forty-four poles and forty-two slots.

12. The brushless DC motorization apparatus of claim 10, wherein said inner stator core has an outer diameter ranging between 150 mm and 350 mm.

13. The brushless DC motorization apparatus of claim 12, wherein said outer diameter of said inner stator core ranges between 150 mm and 250 mm.

14. The brushless DC motorization apparatus of claim 10, wherein said inner stator core is adapted to be secured to an axle of a vehicle.

15. The brushless DC motorization apparatus of claim 10, wherein said inner stator core has a hub supporting a stator yolk, said hub including structural elements diametrically between centers of each set of said teeth of the same phase.

16. An electric bicycle, comprising:
    a wheel positioned along an axle extending along an axis;
    a direct-drive brushless DC motorization apparatus secured to said wheel, said DC motorization apparatus including:
    an outer rotor with forty or forty-four poles constructed with segments of permanent magnet material alternatively magnetized north and south, said outer rotor rotatable about said axis of said wheel;
    an inner stator core of ferromagnetic material spaced inwardly of said outer rotor and secured to said axle of said wheel, said inner stator core defining a clearance gap with said outer rotor such that said outer rotor is rotatable about said inner stator core, said inner stator core having forty-two slots and defining teeth between said slots; and
    a three-phase winding with coils of insulated wire being wound around said teeth of said inner stator core, said three-phase winding being divided in two sets of consecutive teeth for each of said three phases, with each of said two sets of a same phase being diametrically opposed in said inner stator core;

wherein said outer rotor, said inner stator core, and said three-phase winding is configured to operate under a motorization mode and/or an energy recuperation mode;

wherein said inner stator core has a hub supporting a stator yolk, and wherein structural elements extend radially outwardly from said hub and diametrically between centers of each set of said teeth of the same phase.

17. The electric bicycle of claim 16, wherein said wheel includes spokes projecting radially from said outer rotor, and said bicycle further including pedals.

18. The electric bicycle of claim 16, wherein said outer rotor includes forty poles or forty-four poles and forty-two slots.

19. The brushless DC motorization apparatus of claim 16, wherein said three-phase winding is divided in two sets of seven consecutive teeth for each of said three phases.

\* \* \* \* \*